United States Patent [19]

Wendt et al.

[11] 4,131,693
[45] Dec. 26, 1978

[54] HARDENABLE POLYESTERURETHANE COMPOSITION FOR PRODUCING A DIRECTLY TINNABLE WIRE

[75] Inventors: Hartmut Wendt; Horst Von Grüner, both of Hamburg; Harald Janssen, Reinbek, all of Fed. Rep. of Germany

[73] Assignee: Dr. Beck & Co AG, Hamburg, Fed. Rep. of Germany

[21] Appl. No.: 816,775

[22] Filed: Jul. 18, 1977

[30] Foreign Application Priority Data

Jul. 16, 1976 [DE] Fed. Rep. of Germany ....... 2632047

[51] Int. Cl.$^2$ .................... B05D 5/12; B05D 3/02
[52] U.S. Cl. ..................................... 427/117; 427/120; 427/156; 427/388 A; 428/375; 428/378; 428/425; 260/31.2 N; 260/31.2 XA; 260/31.6; 260/32.8 N; 260/33.2 R; 528/80
[58] Field of Search .......... 427/117, 120, 156, 388 A; 428/375, 378, 425; 260/31.2 N, 31.2 XA, 31.6, 32.8 N, 33.2 R, 75 NB, 75 NK

[56] References Cited

U.S. PATENT DOCUMENTS

| 2,935,487 | 5/1960 | Fox et al. ...................... 260/75 NK |
| 2,970,119 | 1/1961 | Caldwell .......................... 260/75 X |
| 2,982,754 | 5/1961 | Sheffer ............................ 260/75 X |
| 3,115,479 | 12/1963 | Windemuth et al. ............ 427/117 X |
| 3,122,451 | 2/1964 | Bunge et al. ..................... 261/75 X |
| 3,252,944 | 5/1966 | Curtis ................................ 427/120 |
| 3,392,128 | 7/1968 | Hostettler et al. ................ 260/75 X |
| 3,554,951 | 1/1971 | Blomeyer et al. .............. 260/75 NK |
| 3,674,746 | 7/1972 | Lohse et al. ...................... 260/75 X |
| 3,763,079 | 10/1973 | Fryd ................................. 260/75 X |
| 3,764,375 | 10/1973 | Orlando et al. ..................... 427/120 |

Primary Examiner—Michael R. Lusignan
Attorney, Agent, or Firm—Michael J. Striker

[57] ABSTRACT

A varnish is provided for coating a wire which is directly tinnable. The varnish comprises hardenable polyester urethane having a urethane equivalent weight of 150–850, the polyester being formed as the product of the reaction of a saturated polyester containing at least two hydroxyl functional groups and an aromatic isocyanate containing at least two functional groups of isocyanate and a phenol-free solvent for the polyester urethane. A process for producing this varnish is also provided.

8 Claims, No Drawings

HARDENABLE POLYESTERURETHANE COMPOSITION FOR PRODUCING A DIRECTLY TINNABLE WIRE

BACKGROUND OF THE INVENTION

Magnet wire or electrically insulated lacquered wire is widely used in the fields of electronics and telecommunication as well as in electric motors and transformers. This wire is formed with generally a copper or aluminum conductor surrounded by a thin but very elastic and heat resistant coat of synthetic resin.

The lacquered wire is made by continuously repeated coatings of a lacquer on the conductor in a lacquering apparatus. The lacquer is basically an organic synthetic resin solution. Following each coating with the lacquer, the wire is heated to a temperature between 300 and 550° C - the exact temperature being chosen after consideration of the lacquer base, the diameter of the wire and the rate of discharge of the wire from the lacquering apparatus. This heating hardens the film of lacquer while evaporating the solvent. The fumes of the solvent are removed by a ventilator.

In order to produce a smooth, bubble- and solvent-free film, it is best to maximize the number of coatings while keeping each coat thin.

There are various types of insulated wires; some of the more important types are defined by DIN (German Industrial Standards) 46416, sheets 1-5. On sheet 2, DIN 46416 specifies the standards for directly tinnable insulated copper wires.

In order to directly tin the wire, the lacquer insulation is spontaneously removed as the insulated wire is dipped into a hot solder bath and the bared wire is simultaneously coated with solder tin.

This behaviour makes it possible to tin the connecting ends of lacquered wire without the mechanical stripping that would otherwise be necessary and which would also be barely possible technically with the fine and ultra-fine wires in the above named fields. The mechanism of this tinning process involves the direct attachment of tin to the copper wire at the usual tinning temperatures of about 370° C. The economic possibilities brought about by this feature of dispensing with mechanical skinning have considerable importance particularly for the broadcasting industry in which each piece of its equipment must be finished with a larger number of soldered junctions.

For over 20 years, this field of insulated wire has been dominated by lacquered wires having polyurethane coats. Polyurethane provides a particularly good coat for directly tinnable insulated wires since the urethane groups are reversibly cleaved at the high temperatures of the soldering bath. As a result of this cleavage, low molecular weight products are formed which function as a flux for the solder tin.

The basic polyurethane lacquer contains a resin component which has at least two free hydroxyl groups per molecule. Generally, this resin is a hydroxylated saturated polyester. The lacquer also has a blocked isocyanate having at least two functional isocyanate groups and a resin-like consistency.

Examples of suitable polyesters include acids like phthalic anhydride or isophthalic acid, or alcohols like ethylene glycol, glycerin or trimethylol propane, in which the hydroxyl group content of these polyesters is about 10 – 15% by weight of the polyester. As a polyisocyanate, a trifunctional isocyanate produced from trimethylolpropane and toluylene-2,4-diisocyanate is almost exclusively used. This trifunctional isocyanate is reacted with phenol in order to block the activity of the free isocyanate groups. The trifunctional isocyanate has the following structural formula:

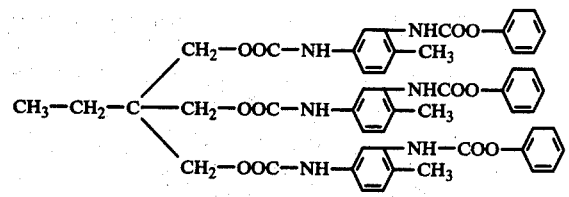

This trifunctional isocyanate is commercially available under the trademark "Desmodur" AP stable from Farbenfabriken Bayer A.G. At present, this isocyanate is practically the sole isocyanate which can bestow the features required for polyurethane varnishes used to produce directly tinnable wire. The isocyanate bestows the important feature of a complete tinning capacity under conditions normally encountered in practice of a soldering bath (375° C) in a short period of time (preferably not more than two seconds). An excellent elasticity is also bestowed. This trifunctional isocyanate has been important in the field of polyurethane varnishes because it has made advances possible in production of single-component varnishes. Such varnishes are necessary for electrical insulating varnish.

The varnish must be composed of ingredients which remain stable at the usual temperatures of the lacquering apparatus and react only at the elevated temperatures present during the heating process.

Furthermore the single-component lacquer must be of constant viscosity as far as possible at normal temperature if one is to obtain a uniformly thick film coating.

The requirement of providing a varnish which reacts only at the elevated temperatures of the heating process is satisfied by blocking the activity of the free isocyanate groups at the usual temperature of the lacquering apparatus. The free isocyanate groups are masked or shielded in order to prevent premature reaction with the alcoholic hydroxyl groups by reacting the isocyanate groups with phenol. Consequently, the mixture of hydroxyl-containing polyester and trifunctional isocyanates can be stored indefinitely at both standard and slightly elevated temperatures. This masking is also known as blocking or hindering. The masking becomes inoperative when sufficient heating (at temperatures above 130° C) causes the isocyanate derivative to dissociate to the original phenol and isocyanate. The freed isocyanates then react with the hydroxyl groups of the polyester to produce polyurethane resin.

Substances other than phenol have been used as masking agents, but have acquired little significance for solderable wire varnishes. Alcohols have not been accepted as masking agents because of the excessive cleavage temperature which is required. As a practical matter, this high cleavage temperature would adversely affect the discharge speed of the coated wire from the lacquering apparatus.

At present, the lacquering solutions generally contain a mixture of phenols and isomers of cresols and xylenols as the principal solvents for the polyester-isocyanate mixture. These solvents are highly toxic and evaporate during heating together with the cleaved phenolic masking agent. Expensive antipollution equipment is required in order to avoid serious environmental pollution.

SUMMARY OF THE INVENTION

The chief object of the invention is to provide an alternative lacquer to the currently used phenol-containing lacquer.

Another object of the invention is to avoid the environmental pollution caused by phenol by dispensing with the use of phenol as a masking agent while still controlling the activity of the isocyanate groups.

Still another object of the invention is to provide hardenable polyester-urethane having free hydroxyl groups and a urethane (NHCOO) equivalent weight of about 150 – 850, preferably 200 – 350.

A further object of the invention is to react saturated polyesters having at least two hydroxyl functional groups with aromatic isocyanates having at least two functional isocyanate groups and to dissolve the product in a phenol-free organic solvent in order to produce a lacquer which is suitable for producing directly tinnable insulated coils of wire which meet the specifications of DIN (German Industrial Standard) 46416, sheet 2.

The production of polyesterurethane having free hydroxyl groups takes place by adding aromatic isocyanates with two or more functional groups of isocyanate to a saturated polyester having two or more functional hydroxyl groups at a temperature range which is between about 100 – 200° C.

Examples of aromatic isocyanates which are used in accordance with this invention include:
 (i) toluylene-2,4- or 2,6-diisocyanate or the usual isomeric mixture of these;
 (ii) 4,4'-diisocyanatodiphenylmethane;
 (iii) 3,3'-dimethyl-4,4'-diisocyanatodiphenylmethane;
 (iv) 1,5-naphthylene diisocyanate;
 (v) 2,4-diisocyanatodiphenylether; and
 (vi) diisocyanatodibenzyl.

The use of aliphatic isocyanates is not favored because they impart a high thermal stability to the urethane groups. Therefore, the time required to remove the lacquer in the soldering bath is disadvantageously excessive.

Polyesterurethane is known per se as a linear adduct which is used to produce exceptionally elastic material with particularly good strength at low temperatures.

In contrast to the polyester urethanes containing hydroxyl groups under discussion here, those above have isocyanate end groups. (For details see E. Mueller in Houben-Weyl, *Makromolekulare Stoffe* II, G. Thieme Verlag, Stuttgart, 1963; and Vieweg/Hoechtlen, *Polyurethane*, Carl Hanser Verlag, Munich, 1966).

The use of hardenable polyesterurethane containing reactive hydroxyl groups in a phenol-free organic solvent in order to produce directly tinnable wire has not yet been proposed.

The saturated polyesters which are used to produce this polyesterurethane are preferably branched polycondensation products which have a relatively low degree of condensation.

As starting material for the hydroxylated polyester (also known as a hydroxyester resin), the usual polyfunctional carboxylic acids and alcohols can be used. For reasons of economy, the following acids and alcohols are preferred:
 (i) o-phthalic acid (in an anhydride form);
 (ii) isophthalic acid;
 (iii) adipic acid;
 (iv) ethylene glycol;
 (v) 1,2-propylene glycol;
 (vi) 1,3-butylene glycol;
 (vii) glycerin; and
 (viii) trimethylolpropane.

In accordance with the generally known laws of synthetic resin chemistry, a hard polyester resin having a high melting point is obtained with the addition of aromatic components (ortho- and isophthalic acid) and a soft polyester resin having a low melting point is obtained with the addition of aliphatic components (adipic acid). The properties of the resultant polyester are also carried over to the final polyesterurethane product.

To provide hydroxyester resin which is used to produce polyesterurethane lacquer for directly tinnable wire, it is necessary that an excess of alcohol be present in comparison with the acid.

The greater the excess of alcohol in the starting mixture, the lower the molecular weight of the resultant polyester resin. In extreme cases - when the molecular ratio of polyfunctional alcohols to difunctional acids is 2 to 1 - a diester is formed with the following structure:

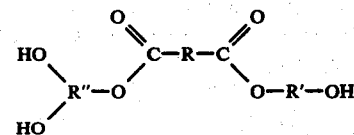

Preferably, the alcohol components consist of a mixture of di-(R') and trifunctional (R") alcohols in a molecular proportion of 1 to 1. Of course, other proportions of diols to triols can be used.

The polyesterurethane with free hydroxyl groups which results from the addition of the polyisocyanate to the hydroxyester resin does not need a phenolic masking agent for stability. Also, a phenolic solvent is not necessary or useful. Instead, less hazardous, preferably higher boiling solvents are used such as methyl-, ethyl-, and butylglycolacetate; glycolic acid butyl esters; methyl-, ethyl- and butyldiglycol; isopropylglycol; methoxybutanol; diacetonic alcohol; cyclohexanone; methoxyhexanone; diisobutyl ketone; cyclohexylacetate; ethylene glycoldiacetate, etc.

These solvents can be diluted with higher boiling aromatics such as xylene, cumene or the aromatic mixture denoted by the term "solvent naphtha."

In order to increase the rate of discharge of the wire from the lacquering apparatus, conventional catalysts for the interchange of ester radicals can be added to the lacquer. Such catalysts include organic titantic acid ester, particularly ethyl titanate, n-propyl titanate, isopropyltitanate, n-butyl titanate, and triethanolamine titanate in quantities of preferably 0.1-2% by weight. Moreover further metalorganic compounds such as lead octoate, zinc naphthenate and zinc (II) oxalate can be added to the lacquer to increase this rate of discharge.

The resulting lacquer solution favorably has a solid body content of about 30 – 50% by weight with a low viscosity of below 400 mPas at standard temperature. In contrast to the customary varnishes, this wire lacquer solution contains neither corrosives nor offensive substances.

This lacquer solution is used to coat metal wire in a lacquering apparatus in the manner previously described. A remarkable advantage is that absolutely no phenol components are cleaved during the coating process.

This lacquer solution is useful for providing a lacquer for directly tinnable insulated wire which conforms to the standards set forth in DIN 46416, sheet 2 (these standards are under the classification "Type V").

DESCRIPTION OF THE PREFERRED EMBODIMENT

The inventions are exemplified for purposes of the illustration of the preferred embodiment in the examples below. These examples are to be construed as only illustrative rather than restrictive of the inventions.

EXAMPLE 1

The Production of the Polyesterurethane

In a 5 liter flask with a ground top having a stirrer and a superimposed water separator, 664 g isophthalic acid (4 moles), 310 g ethylene glycol (5 moles), 184 g glycerine (2 moles) and 268 g trimethylolpropane (2 moles) are heated to 220° C while stirring and conducting inert gas into the flask.

144 g of water are produced (in theory) as condensate in the water separator. It should be ensured that the head temperature does not exceed 100° C during esterification.

After the separation of the condensate, the contents of the flask are cooled to 150° C and the condenser is filled with xylene. The residual water is removed with 100 ml of additional xylene. After 30 minutes, the condenser is emptied, the residual xylene is distilled off and the contents of the flask is then cooled to 140° C.

600 g methyldiglycol are added and by means of a dropping funnel 696 g toluylene-2,4-diisocyanate (4 moles) are slowly added drop by drop. An exothermic reaction sets in. After completion of the isocyanate addition, the contents of the flask are kept at 150° C for two hours and are then dissolved in 1378 g xylene.

Regulation and Catalysis of the Esterurethane Wire Lacquer

The Polyesterurethane obtained in accordance with the process defined by Example 1 is diluted with 1187 g methyldiglycol and 395.7 xylene. Then the resultant mixture is catalyzed with 19.8 g triethanolamine titanate.

The running time measured in a DIN (German Industrial Standard) beaker having a 4 mm nozzle amounts to 22 seconds at 23° C. The solid body content amounts to 41.7% (a 1 g weighed portion heated for 1 hour at 180° C).

Insulation of the Electrical Conductor:

The coating of a 0.14 mm bare copper wire is performed in a continuous operation with a 1.75 m horizontal oven at an oven temperature of 500 – 520° C and a rate of discharge of 100 m/min.

The required thickness of 21 μ for this diameter of bare copper wire is obtained with eight dippings of the wire into the lacquer.

The properties of the produced lacquered wire are as follows (unless otherwise noted, these correspond to specifications of DIN 46453):

| | |
|---|---|
| Surface Hardness (Pencil Hardness) | 5 H |
| Winding strength after 25% preliminary elongation | 84 % |
| Heat shock | 1 hour, 185° C 1×0 o.k. |
| Tinnability at 375° C | 0.20 – 0.25 sec. |
| Softening temperature | 220° C |

EXAMPLE 2

Production of the Polyester

Ester A

In a 1 liter flask with a ground top with a stirrer and a superimposed water separator, 166 g isophthalic acid (1 mole), 134 g trimethylolpropane (1 mole), and 92 g glycerin (1 mole) are heated to 220° C while stirring.

36 g water accumulates in the water separator. The condensation is complete when the acid number is smaller than 1.

Ester B

In a 1 liter flask with a ground top with a stirrer and a superimposed water separator, 146 g adipic acid (1 mole), 118 g hexandiol-1,6 (1 mole) and 62 g ethylene glycol (1 mole) are heated to 220° C while stirring.

36 g water accumulate in the water separator. The condensation is complete when the acid number is less than 1.

Production of the Polyesterurethane

In a 5 liter flask with a ground top with a stirrer and a superimposed cooler, 435 g of Ester B (1.5 moles) is dissolved in 723 g methyldiglycol and 544.2 g xylene. The contents of the flask are heated to 140° C and 541.8 g of Desmodur L (67% in ethylglycolacetate:xylol=1:1) from Fa. Bayer A.G. is added over a time period of 15 – °minutes, the amount of Desmodur L corresponding to 0.55 moles of the adduct of 3 moles of toluylene-2,4-diisocyanate in 1 mole of trimethylolpropane. The temperature climbs to 150° C because the reaction is exothermic.

After keeping the mixture at 150° C for about 1½ hours, the reaction is completed and 356 g of ester A (1 mole) are added.

174 g of toluylene-2,4-diisocyanate (1 mole) are added dropwise at 140° C. over a 15 minute period. The contents of the flask are kept for 1 hour at 150° C; then 31 g ethyleneglycol (0.5 moles) are added, and a further 87 g of toluylene-2,4-diisocyanate (0.5 moles) is added.

After these additions, the contents of the flask are kept for 2 hours at 160° C. The contents of the flask are then cooled to about 40° C; then the contents are diluted with 375 g xylene and 250 g ethanol and are catalyzed with 14.5 g triethanolamine titanate.

The running time in a DIN-beaker 4 mm/23° C = 22 sec. Solid bodies after 1 hour at 180° C, 1 g weighed portion = 46.1%.

Insulation of the Conductor

The coating of a 1.14 mm bare copper wire is performed in a continuous operation with a 1.75 m horizontal oven at an oven temperature of 500 – 520° C and a discharge rate of 100 m/min.

The required thickness of 21 μ for this diameter of bare wire is obtained with 8 dippings.

The properties of the produced wire are measured below:

| | |
|---|---|
| Surface hardness in accordance with DIN 46453 (pencil hardness) | 4 H |
| Winding strength after 25% preliminary elongation | 70 % |
| Heat shock | 1 hour, 185° C, 1×0 o.k. |
| Tinnability at 375° C | 0.40 – 0.45 sec. |
| Softening temperature in accordance with DIN 46453 | 210° C. |

It will be understood that each of the elements described above, or two or more together, may also find a useful application in other types of constructions differing from the types described above.

While the invention has been illustrated and described as embodied in a hardenable polyurethane composition for producing a directly tinnable wire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for producing a coating for directly tinnable wire, comprising the steps of
   forming a hardenable polyester urethane having a urethane equivalent (NHCOO-) weight of 150 – 850 by reacting at 100 – 200° C (A) a polyester having an excess of alcohol groups relative to the acid groups so as to provide at least two free hydroxyl groups with an aromatic polyisocyanate containing at least two free isocyanates end groups so as to form a polyurethane through reaction of said hydroxyl groups with said isocyanate end groups,
   dissolving the formed polyester urethane in a phenol-free organic solvent so as to make a varnish; and
   applying said varnish to a wire and curing it so as to form a coating on said wire whereby the wire can be tinned directly and speedily due to the fact that on immersion of a portion of such wire into a bath of solder the varnish coating on the immersed portion will become removed and the wire exposed for direct tinning.

2. A process as defined in claim 1, wherein said aromatic isocyanate is a member selected from the group consisting of toluylene-2,4-diisocyanate, toluylene-2,6-diisocyanate, 4,4'-diisocyantodiphenylmethane, 3,3'-dimethyl-4,4'-diisocyanatodiphenylmethane, 1,5-naphthylenediisocyanate, 2,4-diisocyanatodiphenylether and diisocyanatodibenzyl.

3. A process as defined in claim 1, wherein said polyester is a branched polycondensation product.

4. A process as defined in claim 1 wherein the polyester is the reaction product of a carboxylic acid selected from the group consisting of orthophthalic acid, adipic acid or isophthalic acid with an alcohol selected from the group consisting of ethyleneglycol, 1,2-propyleneglycol, 1,3-butyleneglycol, glycerin or trimethylolpropane.

5. A process as defined in claim 4, wherein the said alcohol is a mixture of difunctional and trifunctional alcohols in a 1:1 proportion.

6. A process as defined in claim 1, wherein a metalorganic catalyst for the interchange of ester radicals is added to said varnish, said catalyst being a member selected from the group consisting of ethyl titanate, n-propyl titanate, n-butyl titanate, triethanolamine titanate, lead octoate, zinc naphthenate and tin (II) oxalate.

7. A process as defined in claim 1, wherein the solvent includes a higher temperature boiling aromatic diluent selected from the group consisting of xylene, cumene and solvent naphtha.

8. A process as defined in claim 4, wherein said phenol-free solvent is a member selected from the group consisting of methylglycolacetate, ethylglycolacetate, butylglycolacetate, glycolic acid butyl ester, methyldiglycol, ethyldiglycol, butyldiglycol, isopropylglycol, methoxybutanol, diacetonic alcohol, cyclohexanone, methoxyhexanone, diisobutyl ketone, cyclohexylacetate and ethyleneglycol diacetate.

* * * * *